United States Patent
Montone et al.

[11] Patent Number: 6,123,386
[45] Date of Patent: Sep. 26, 2000

[54] DUAL ACTION REAR GATE DOOR HANDLE ASSEMBLY

[75] Inventors: Keith D. Montone, West Bloomfield; John F. Miller, Clinton Township; Philip M. Jansen, Farmington Hills; Thad Scott, Grosse Point Woods; Michael E. Hilliard, Plymouth; Kipp D. Owen, Franklin, all of Mich.

[73] Assignee: DaimlerChrysler Corporation, Auburn Hills, Mich.

[21] Appl. No.: 09/302,079

[22] Filed: Apr. 28, 1999

[51] Int. Cl.⁷ .................................................. B60J 5/10
[52] U.S. Cl. ........................ 296/146.8; 296/51; 292/336.3
[58] Field of Search ............................ 296/106, 146.8, 296/50, 51, 56; 292/DIG. 3, DIG. 29, DIG. 43, 336.3, DIG. 31, 347

[56] References Cited

U.S. PATENT DOCUMENTS

| | | | |
|---|---|---|---|
| 2,793,907 | 5/1957 | Hess et al. | 296/106 |
| 3,004,757 | 10/1961 | Lohr | 49/136 |
| 3,145,988 | 8/1964 | Colautti et al. | 49/280 |
| 3,146,021 | 8/1964 | Ericson | 296/106 |
| 3,162,480 | 12/1964 | Siegert | 296/57.1 |
| 3,318,049 | 5/1967 | Arlauskas | 49/280 |
| 3,400,961 | 9/1968 | Koch et al. | 292/216 |
| 3,408,100 | 10/1968 | McKey | 292/216 |
| 3,519,300 | 7/1970 | McKey | 292/216 |
| 3,567,274 | 3/1971 | Kaptur, Jr. et al. | 296/50 |
| 3,592,504 | 7/1971 | Sandor | 296/70 |
| 3,858,921 | 1/1975 | Kuki | 292/336.3 |
| 4,076,301 | 2/1978 | Gergoe | 296/50 |
| 4,706,478 | 11/1987 | Swan et al. | 70/28 |
| 4,883,296 | 11/1989 | Laurie | 292/336.3 |
| 5,174,619 | 12/1992 | Bender et al. | 292/336.3 |
| 5,295,374 | 3/1994 | Bender et al. | 70/208 |
| 5,377,450 | 1/1995 | Varajon | 49/502 |
| 5,563,483 | 10/1996 | Kowall et al. | 318/283 |
| 5,702,144 | 12/1997 | Matsuura et al. | 296/37.13 |
| 5,852,943 | 12/1998 | Dutka et al. | 70/237 |
| 5,882,053 | 3/1999 | Bekins et al. | 292/336.3 |
| 5,961,165 | 10/1999 | Aizawa et al. | 292/336.3 |

*Primary Examiner*—D. Glenn Dayoan
*Assistant Examiner*—Patricia Engle
*Attorney, Agent, or Firm*—James R. Yee

[57] ABSTRACT

A rear gate assembly of a motor vehicle is provided. The motor vehicle has a rear gate opening. The rear gate assembly includes a rear gate, a back glass, and a rear gate handle. The rear gate includes a rear gate top portion, a rear gate bottom portion, and an outer surface and has a latched and unlatched position. The rear gate bottom portion is rotatably coupled to a bottom edge of the rear gate opening. The back glass has a back glass top portion and a back glass bottom portion. The back glass top portion is rotatably coupled to a top edge of the rear gate opening and has a latched and unlatched position. The rear gate handle is coupled to the outer surface of the rear gate and is actuatable from a first position to a second position. The rear gate assembly sequentially releases the back glass and rear gate from the respective latched positions in response to actuation of the rear gate handle.

10 Claims, 7 Drawing Sheets

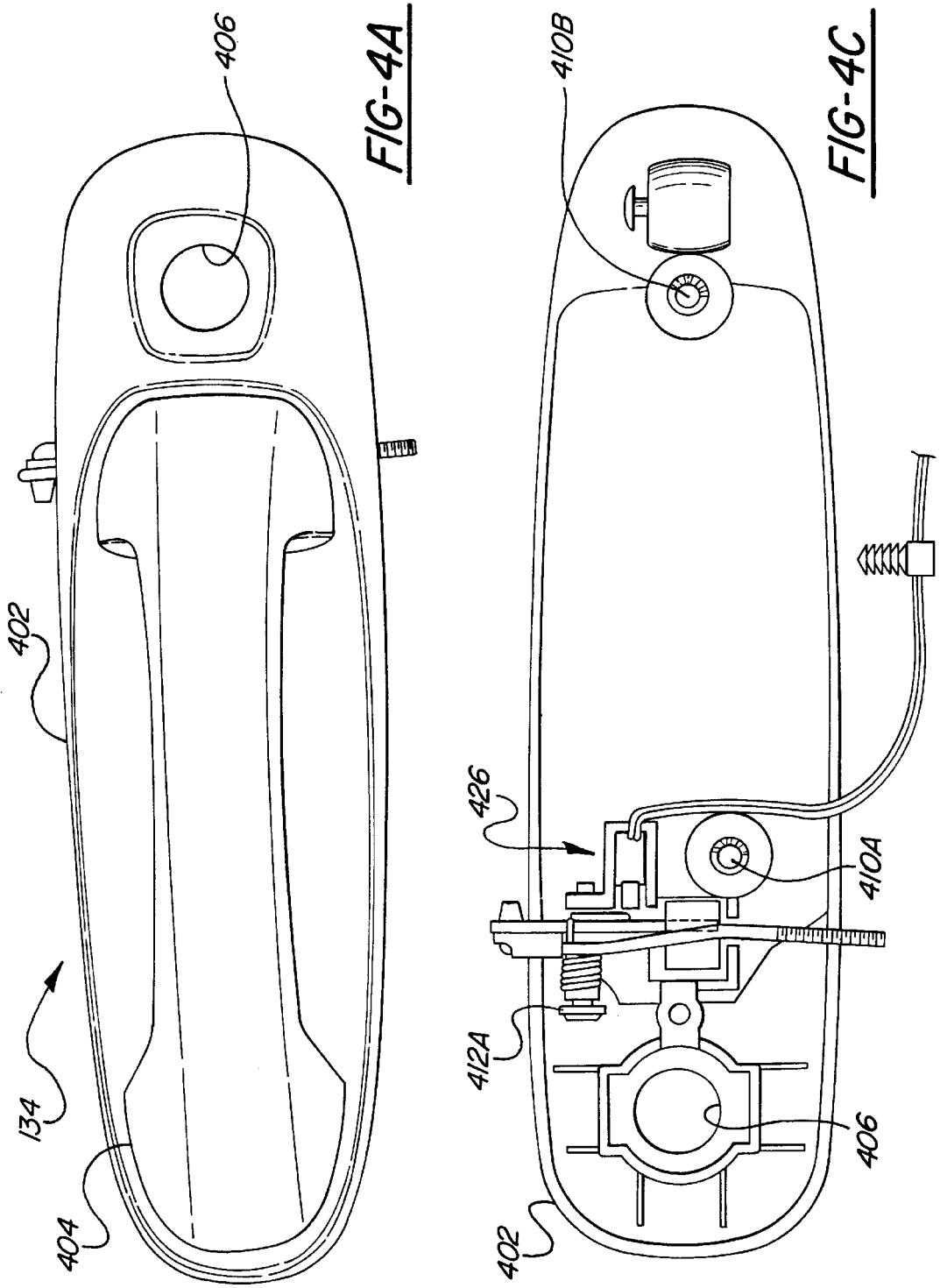

DUAL ACTION REAR GATE DOOR HANDLE ASSEMBLY

FIELD OF THE INVENTION

This invention relates generally to a rear gate assembly for a motor vehicle, and more particularly to an apparatus for sequentially releasing a back glass and a rear gate of a motor vehicle.

BACKGROUND OF THE INVENTION

One of the more interesting trends in the automobile industry is to provide hybrid vehicles, i.e., a vehicle that can serve multiple purposes by combining features of more traditional vehicle types.

Many of these vehicles are aimed at combining the ability to transport people comfortably and the ability to transport object. Many of these hybrid vehicles include a door at the rear combined with a window. This rear door and window combination may be referred to as a rear gate.

Commonly, the door and window are hinged, the window at the top half of a rear gate opening in the vehicle and the door at the bottom half of the rear gate opening (either the side or bottom). In order to facilitate movement of objects into and out of the vehicle through the rear both the rear door and the rear back glass must be opened.

In order to fully open the rear gate the back glass must be opened prior to the door. Prior rear gate door handle assembly required two separate actions in order to open both the door and rear back glass. For example, in U.S. Pat. No. 5,295,374 issued to Frederick F. Bender et al, on Mar. 22, 1994, opening of the rear back glass requires actuation of a pushbutton and opening of the door requires actuation of a door handle.

The present invention is aimed at one or more of the problems set forth above.

SUMMARY OF THE INVENTION

In one embodiment of the present invention, a rear gate assembly of a motor vehicle is provided. The motor vehicle has a rear gate opening. The rear gate assembly includes a rear gate, a back glass, and a rear gate handle, The rear gate includes a rear gate top portion, a rear gate bottom portion, and an outer surface and has a latched and unlatched position. The rear gate bottom portion is rotatably coupled to the rear gate opening. The back glass has a back glass top portion and a back glass bottom portion. The back glass top portion is rotatably coupled to a top edge of the rear gate opening and has a latched and unlatched position. The rear gate handle is coupled to the outer surface of the rear gate and is actuatable from a first position to a second position. The rear gate assembly sequentially releases the back glass and rear gate from the respective latched positions in response to actuation of the rear gate handle.

On another embodiment of the present invention a dual action rear gate door handle assembly for use with a rear gate assembly of a motor vehicle is provided. The motor vehicle has a rear gate rotatably coupled to a rear gate opening of the motor vehicle and a back glass rotatably coupled to a top edge of the rear gate opening. The rear gate and the back glass each having a latched and unlatched position. The door handle assembly includes a rear gate handle coupled to the rear gate. The rear gate handle is actuatable from a first position to a second position. The door handle assembly sequentially releases the back glass and rear gate from the respective latched positions in response to actuation of the rear gate handle.

BRIEF DESCRIPTION OF THE DRAWINGS

FIG. 4A is a front perspective view of a portion of the door handle assembly according to a first embodiment of the present invention;

FIG. 4C is a second back perspective view of a portion of the door handle assembly according to the first embodiment of the present invention;

DETAILED DESCRIPTION OF THE PREFERRED EMBODIMENT

With reference to the drawings and in operation, the present invention provides a dual action rear gate door handle assembly 102.

Figure 1:
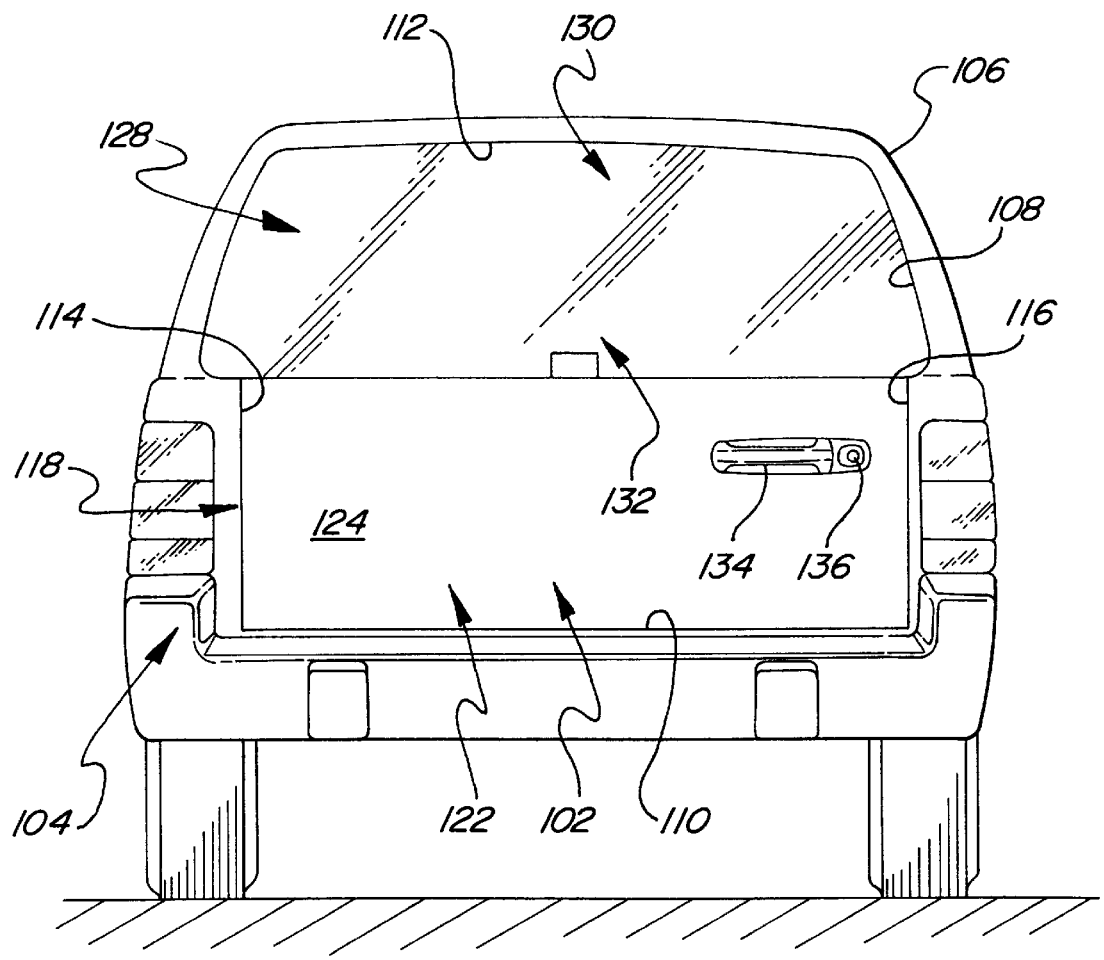
FIG. 1 is a diagrammatic illustration of a door handle assembly mounted on a motor vehicle having a rear gate and rear back glass, according to an embodiment of the present invention.
Figure 2:
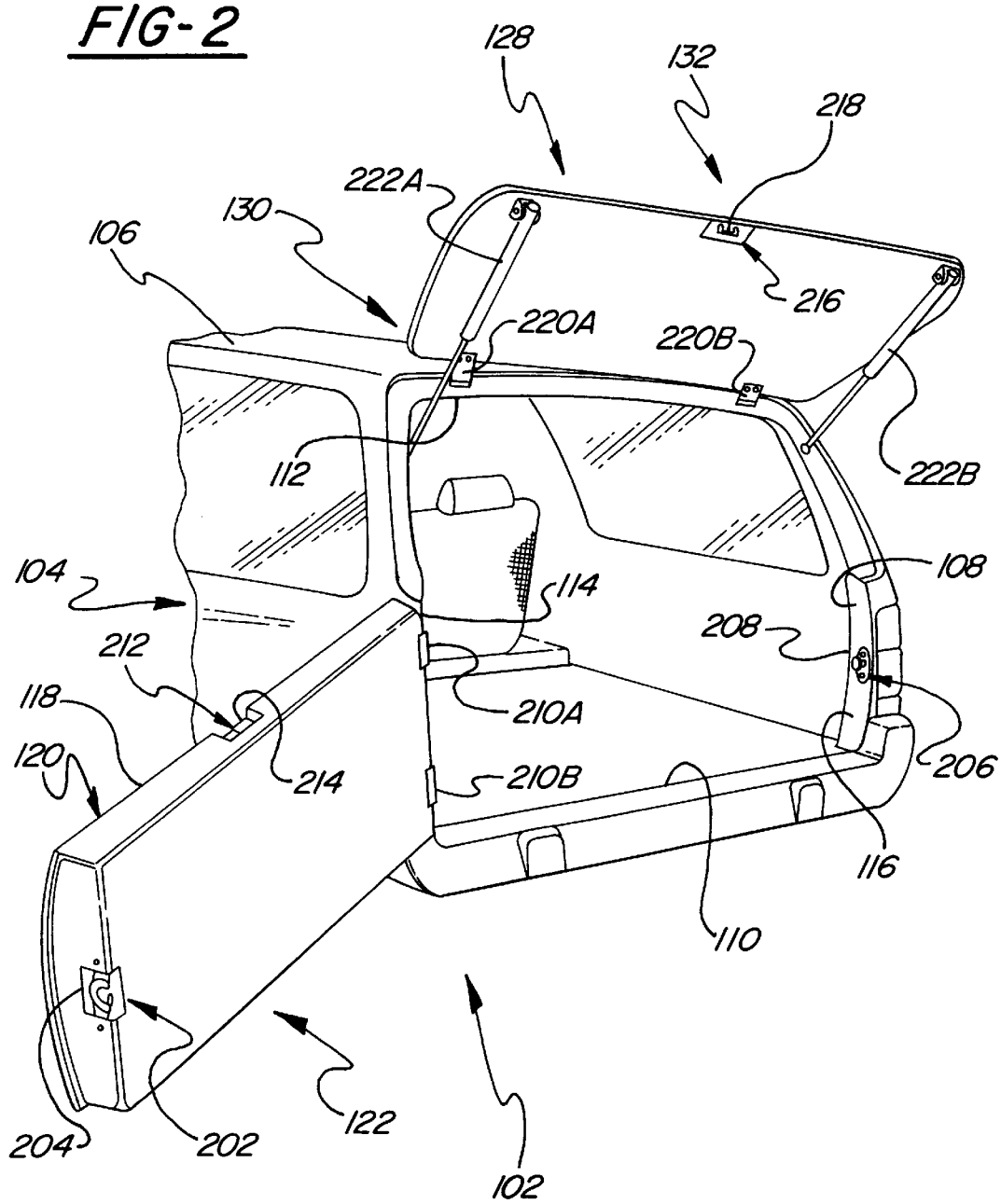
FIG. 2 is a diagrammatic illustration of the motor vehicle of FIG. 1 with the rear gate and back glass in an open position.

With particular reference to FIGS. 1 and 2, the dual action rear gate door handle assembly 102 is adapted for use with a rear gate assembly 104 of a motor vehicle 106 (shown in part). The motor vehicle 106 includes a rear gate opening 108 with a bottom edge 110, a top edge 112 and first and second side edges 114, 116.

A rear gate 118 is fitted into the lower portion of the rear gate opening 108. The rear gate 118 has a rear gate top portion 120, a rear gate bottom portion 122, and an outer surface 124.

With particular reference to FIG. 2, a rear gate latch mechanism 202 maintains the rear gate 118 in the latched position wherein the rear gate 118 is fitted into the bottom portion of the rear gate opening 108. As shown, the rear gate latch mechanism 202 includes a rear gate latch 204 mounted to the rear gate 118 and a rear gate striker plate 206 mounted to the motor vehicle 106 near the second side edge 116. The rear gate striker plate 206 includes a rear gate "U" shaped member 208. The rear gate latch 204 is adapted to capture and hold the rear gate "U" shaped member 208 when the rear gate 118 is closed. The rear gate latch mechanism 202 operates in a known fashion and is not further discussed.

The rear gate 118 is rotatably coupled to a side edge of the rear gate opening 108 via first and second rear gate hinges 210A, 210B in a conventional manner. The rear gate 118 is movable between a latched or closed position and an unlatched or fully open position (see FIGS. 1 and 2, respectively).

A back glass 128 is fitted into the upper portion of the rear gate opening 108. The back glass 128 includes a back glass top portion 130 and a back glass bottom portion 132.

With particular reference to FIG. 2, a back glass latch mechanism 212 maintains the back glass 128 in the latched position wherein the back glass 128 is fitted into the top portion of the rear gate opening 108. As shown, the back glass latch mechanism 212 includes a back glass latch 214 mounted to the rear gate 118 and a back glass striker plate 216. The back glass striker plate 216 includes a back glass "U" shaped member 218. The back glass latch 214 is adapted to capture and hold the "U" shaped member when the back glass 128 is closed. The back glass latch mechanism 212 operates in a known fashion and is not further discussed.

The back glass 128 is rotatably coupled to the top edge 112 of the rear gate opening 108 via first and second back glass hinges 220A, 220B. The back glass 128 is movable between a latched or closed position and an unlatched or fully open position, as shown in FIGS. 1 and 2, respectively.

First and second pneumatic cylinders 222A, 222B further couple the back glass 128 to the motor vehicle 106 and bias the back glass 128 to the fully open position (shown in FIG. 2) when the back glass latch mechanism 212 is operated to release the back glass 128 (see below).

Returning to FIG. 1, a rear gate handle 134 is mounted to the outer surface 124 of the rear gate 118. In the preferred embodiment, the rear gate handle 134 is hinged at the left side and is actuatable from a first position to a second position. A key cylinder 136 operates to lock and unlock the rear gate 118 and back glass 128 (see below).

Figure 3:
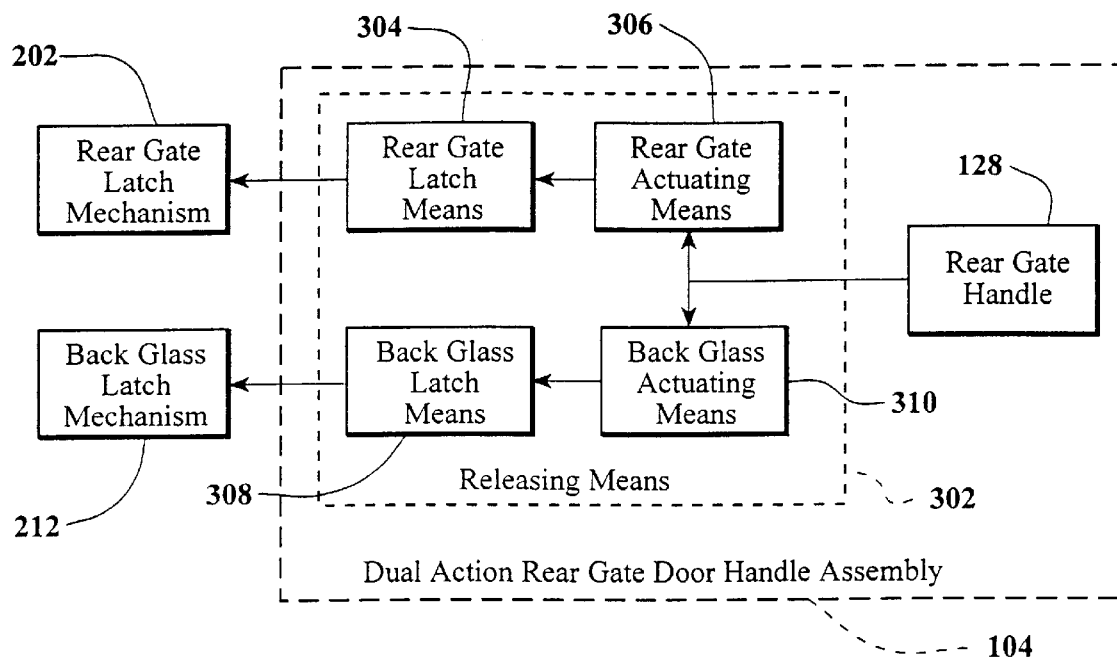
FIG. 3 is a block diagram of a door handle assembly according to the present invention.

With reference to FIG. 3, the dual action rear gate door handle assembly 102 includes releasing means 302 for sequentially releasing the back glass 128 and rear gate 118 from the respective latched positions in response to actuation of the rear gate handle 134.

The releasing means 302 includes rear gate latch means 304 and rear gate actuating means 306. The rear gate latch means 304 is coupled to the rear gate 118 via the rear gate latch mechanism 202 and controls latching and releasing the rear gate 118 from the latched position. The rear gate actuating means 306 is coupled to the rear gate handle 134 and to the rear gate latch means 304. The rear gate actuating means 306 is responsive to the rear gate handle 134 being moved from the first position to the second position and controllably actuates the rear gate latch means 304 to release the rear gate 118 from the latched position.

The releasing means 302 also includes back glass latch means 308 and back glass actuating means 310. The back glass latch means 308 is coupled to the back glass 128 via the back glass latch mechanism 212 and controls latching and releasing of the back glass 128 from the latched position. The back glass actuating means 310 is coupled to the rear gate handle 134 and to the back glass latch means 308. The back glass actuating means 310 is responsive to the rear gate handle being moved from the first position to the second position and controllably actuates the back glass latch means 308 to release the back glass 128 from the latched position.

In a first embodiment, the rear gate actuating means and rear gate latch means are comprised of a mechanical system and the back glass actuating means and back glass latch means are comprised of an electronic system.

With reference to FIGS. 4A–4D, a more detailed look at the rear gate handle 134 and portions of the rear gate and back glass actuating means 306, 310 according to the first embodiment is provided. The rear gate handle 134 includes a base portion 402 and a handle portion 404. A key cylinder aperture 406 is provided for insertion of the key cylinder 136. A U-shaped actuation portion 408 extends from one end of the handle portion 404 through an aperture in the base portion 402. The handle portion 404 is hinged to the base portion 402 at the other end. First and second mounting bolts 410A, 410B are mounted to the base portion 402. The mounting bolts 410A, 410B are inserted through suitable holes in the rear gate and secured by associated nuts (not shown) in a conventional manner.

The rear gate actuating means 306 includes first and second mounting flanges 412A, 412B extending from the base portion 402. A camming plate 414 is rotably coupled to the base portion 402 via a pin 416 inserted through apertures in the camming plate 414 and mounting flanges 412A, 412B, as shown.

The rear gate actuating means 306 further includes a first lever portion 418 extending from the camming plate 414. The first lever portion 418 is inserted into the U-shaped actuation portion 408 of the handle portion 404. A spring 420 is preferably coiled around the pin 416 between the first and second mounting flanges 412A, 412B. One end of the spring 422 is preferably in a hook shape and biased against the camming plate 414. The other end of the spring 422 is biased against the base portion 404. The spring 422 acts to bias the camming plate 414 in a downward position relative to the base portion 404. In this downward position, the first lever portion 418 of the camming plate 414 is biased outward from the base portion 404 and acts against the interior of the U-shaped portion 406 of the handle portion 404. This operation acts to maintain the handle portion 404 in a normally closed position.

In the first embodiment, the rear gate latch means 304 includes a second lever portion 422 extending from the camming plate 414. An acting rod 424 (shown partially in FIG. 4D) is coupled to the second lever portion 422 via a pin 426.

When the handle portion 404 is pulled away from the motor vehicle 106, the U shaped portion 406 is pulled back through the base portion 402. This exerts force on the first lever portion 418, rotating the camming plate 414 around the pin 416. The second lever portion 422 of the camming plate 414 is also rotated around the pin 416 forcing the acting rod 424 is a generally downward direction. The acting rod 424 is coupled to the rear gate latch 204 to open the rear gate latch 204 is response to movement of the handle portion 404. The handle assembly 102 operates in a known manner to release the rear gate latch 204 in a conventional manner and is therefore not further discussed.

In the first embodiment, the back glass actuating means includes a switch mechanism 426 and a switch engaging portion 428. The switch engaging portion 428 is formed as part of the camming plate 414.

Figure 5:
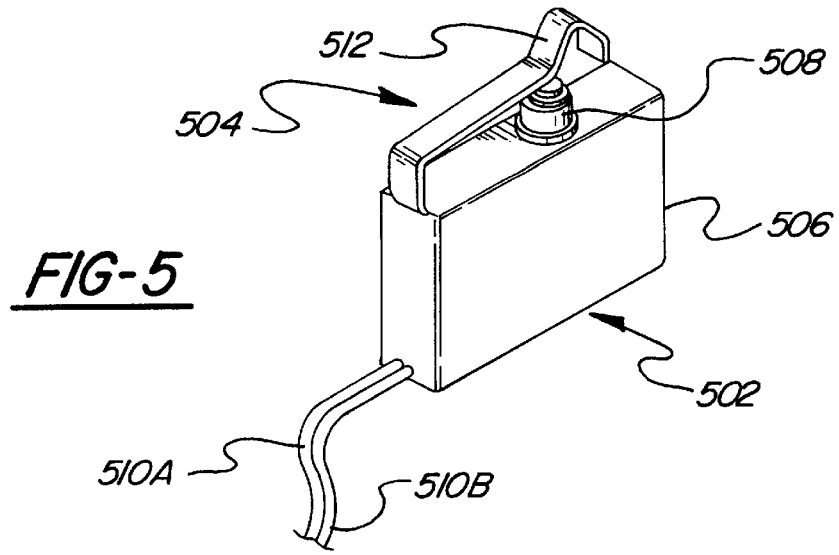
FIG. 5 is a detailed illustration of a switch mechanism forming part of the present invention.

With reference to FIG. 5, the switch mechanism 426 includes a switch 502 and a contact portion 504. The switch 502 includes a body 506, a pushbutton 508, and first and second electrical leads 510A, 510B. The switch mechanism 502 operates in a known fashion, i.e., when the pushbutton is depressed a signal is transmitted via the electrical leads 510A, 510B.

As shown, the contact portion 504 is fastened to the side of the body 506 and extends over the pushbutton 508. The contact portion includes a non-linear portion 512.

Figure 6:
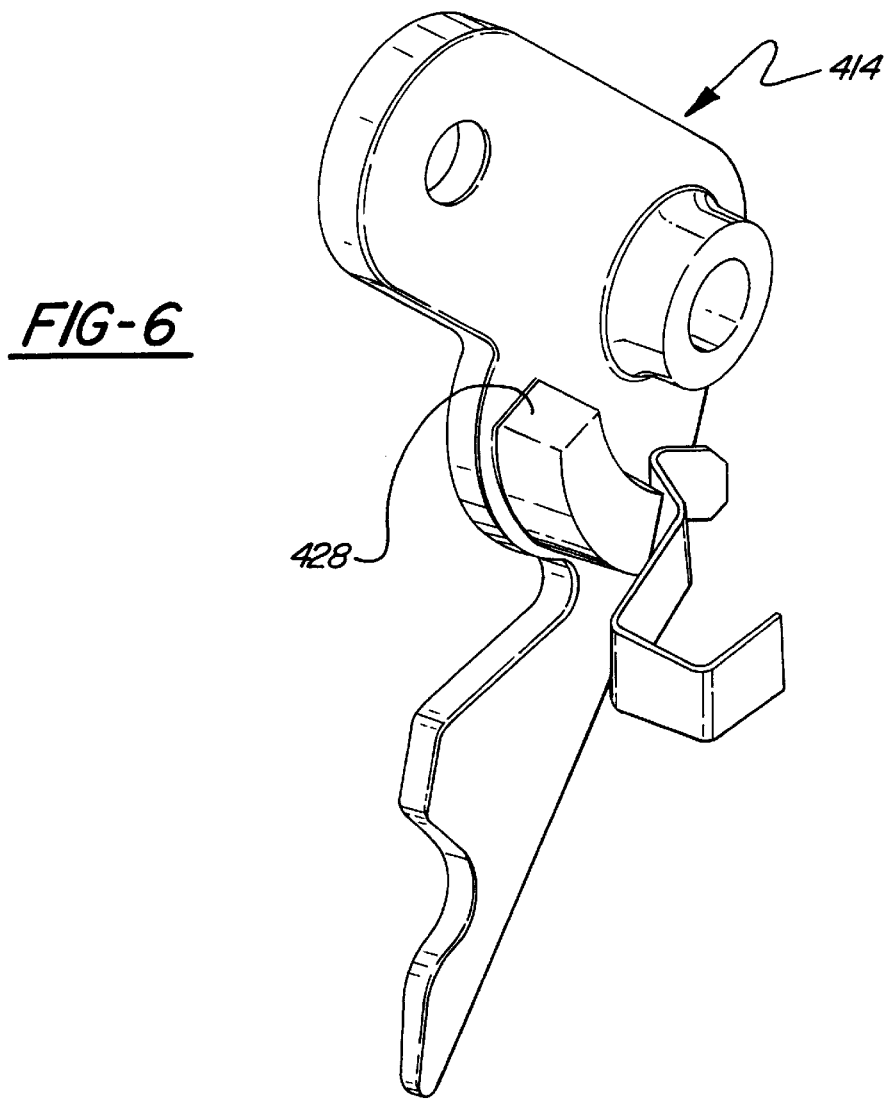
FIG. 6 is a blown up drawing of portions of the switch mechanism of FIG. 5.

With reference to FIG. 6, only the camming plate 414 and the contact portion 504 are shown to illustrate interplay therebetween. As the handle portion 404 is actuated, the U-shaped portion 408 is pulled back (through the base portion 402). The U-shaped portion 408 acts against the first lever portion 418 of the camming plate 414, thereby rotating the camming plate 414 around the pin 416. As the camming plate 414 begins to rotate, the switch engaging portion 428 comes into contact with the contact portion 504 of the switch mechanism 426.

As the camming plate 414 rotates, the switch engaging portion 428 bends the contact portion 504 towards the pushbutton 508. When the switch engaging portion 428 comes into contact with the nonlinear portion 512 of the contact portion 504, the nonlinear portion 512 exerts additional resistance to the rotation of the camming plate 414 and thereby to movement of the handle portion 404.

This signals the person actuating the handle portion 404 that the back glass is about to be released. As the handle portion 404 and camming plate 414 are moved past the additional resistance, the switch engaging portion 428 presses against the pushbutton to activate the switch 502 and to generate a switch actuation signal.

The dual action rear gate door handle assembly 102 is designed such that actuation of the switch 502 occurs prior to actuation of the rear gate latch 204 as described above.

Figure 7:
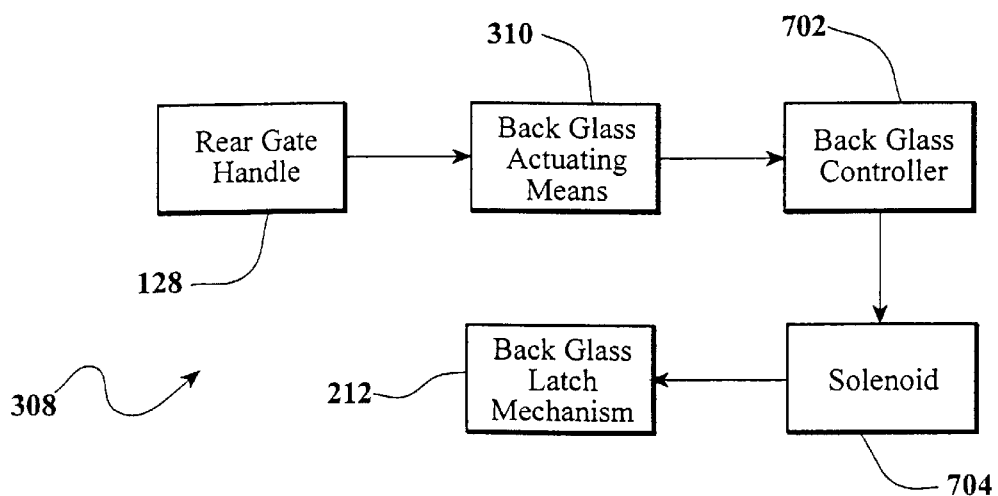
FIG. 7 is a more detailed block diagram of a portion of the present invention, according to a first embodiment.
Figure 4B:
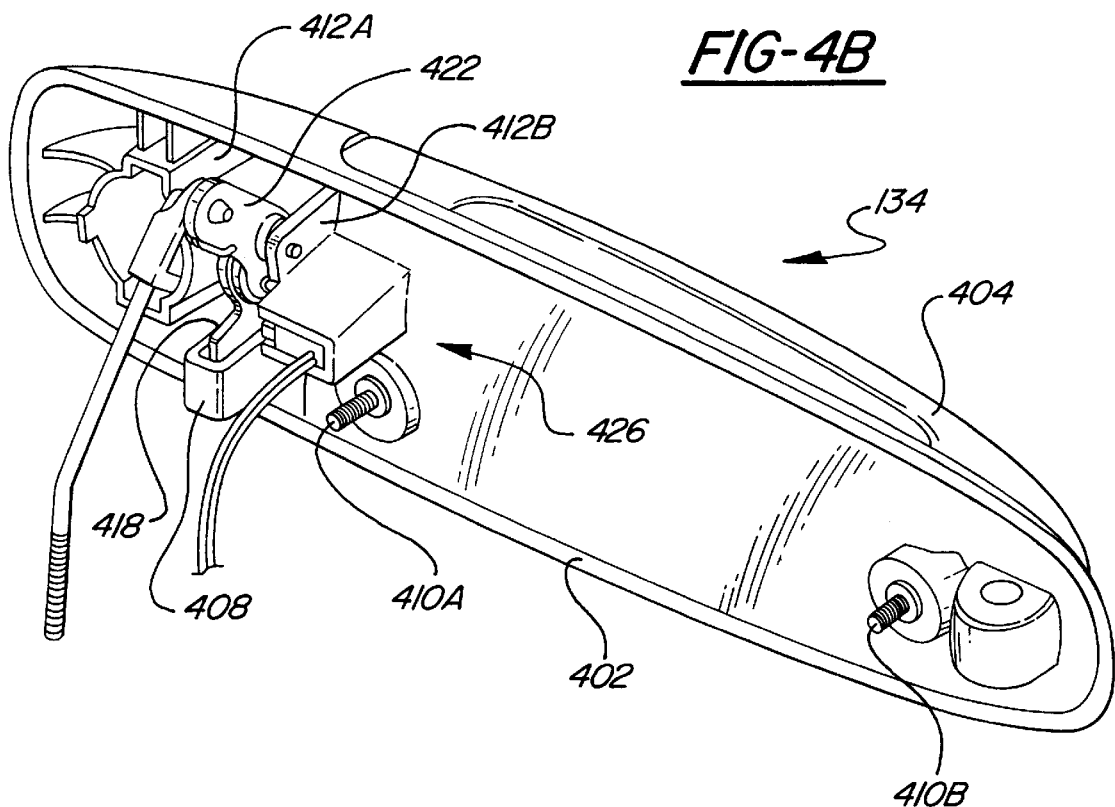
FIG. 4B is a first back perspective view of a portion of the door handle assembly according to the first embodiment of the present invention.
Figure 4D:
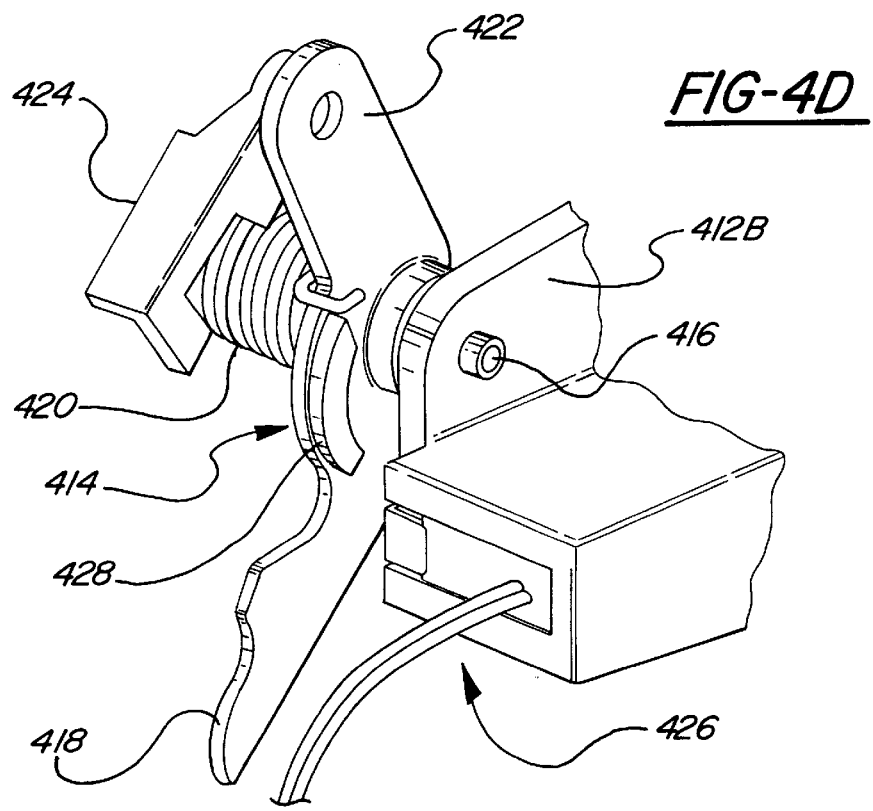
FIG. 4D is an exploded perspective view of a portion of the door handle assembly according to the first embodiment of the present invention.

With reference to FIG. 7, the back glass latch means 308 includes a back glass controller 702 and an electrically actuated solenoid 704. The back glass controller 702 is preferably a microprocessor or microcontroller based control module which performs additional functions for the motor vehicle 106. For example, the control module may also control a power lock function for the motor vehicle 106.

The back glass controller 702 receives the switch actuation signal from the switch 502 and controllably actuates the electrically actuated solenoid 704. The electrically actuated solenoid 704 is coupled to the back glass latch mechanism 212. When actuated the electrically actuated solenoid 704 actuates back glass latch 214 to release the back glass 128 from its latched position.

Preferably, the back glass controller 702 prevents opening of the back glass (by not actuating the electrically actuated solenoid 704) under certain conditions, e.g., if (1) the vehicle is locked or (2) a back glass wiper is active.

After the back glass 128 is released from its latched position, the first and second pneumatic cylinders 222A, 222B automatically raise the back glass 128 to its fully open position. With continuing actuating of the rear gate handle 134, the rear gate is released as described above.

Figure 8:
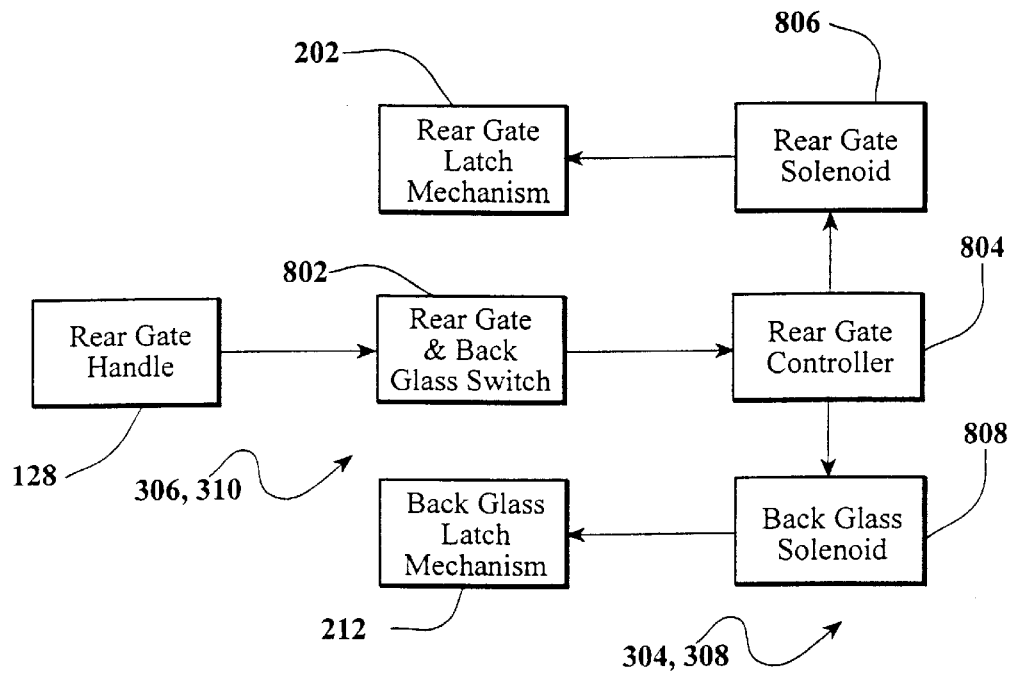
FIG. 8 is a more detailed block diagram of a portion of the present invention, according to a second embodiment; and, FIG. 9 is a more detailed block diagram of a portion of the present invention, according to a third embodiment.

With reference to FIG. 8, in a second embodiment, the rear gate actuating means 306 and the back glass actuating means 310 are electronic systems. The rear gate actuating means 306 and the back glass actuating means 310 are comprised of a switch mechanism 802 as shown in 4A–4D, 5 and 6. The switch mechanism 802 is coupled to a rear gate controller 804. The rear gate controller 804 is coupled to an electrically actuated rear gate solenoid 806 and an electrically actuated back glass solenoid 808. The rear gate solenoid 806 and the back glass solenoid 808 are coupled to the rear gate latch mechanism 202 and the back glass latch mechanism 212, respectively.

In the second embodiment, opening of both the rear gate 118 and the back glass 128 requires two "pulls", i.e., the switch mechanism 802 must be triggered twice.

When the switch mechanism 802 is triggered the first time, the back glass 128 is opened via the rear gate controller 804 and the back glass solenoid 808, as described above.

If the switch mechanism 802 is triggered again within a predetermined period of time, then the rear gate controller 804 actuates the rear gate solenoid 806. When actuated, the rear gate solenoid 804 actuates rear gate latch mechanism 202 to release the rear gate 118 from its latched position.

Figure 9:
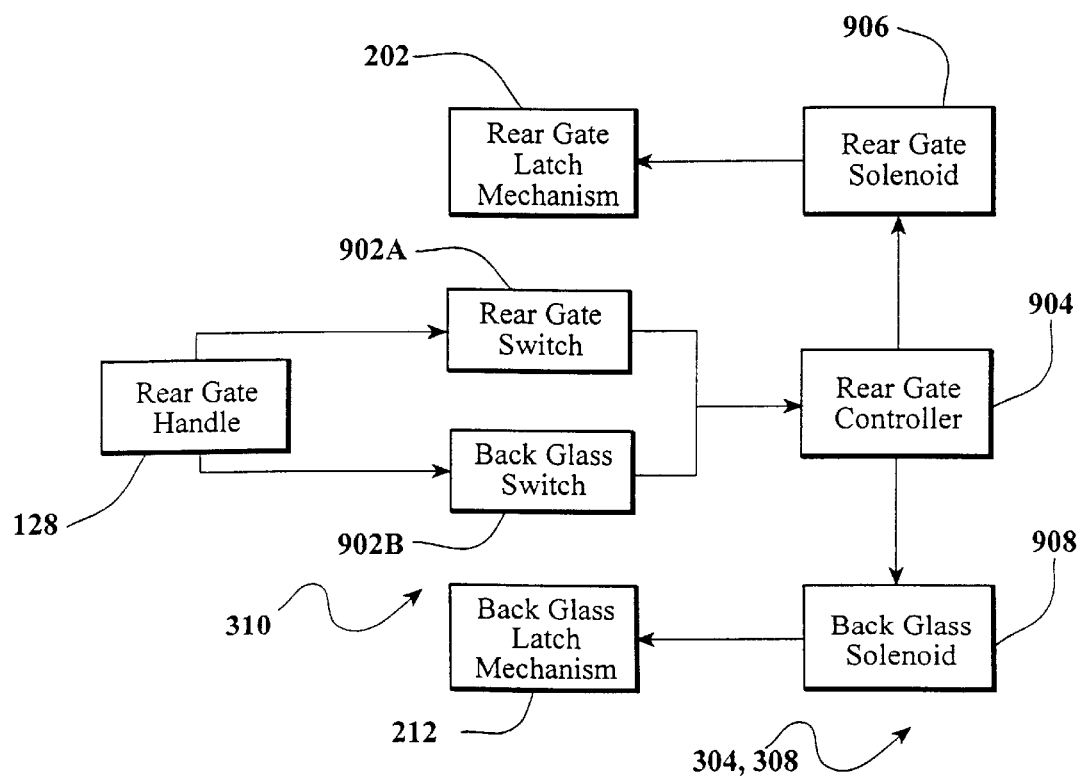

With reference to FIG. 9, in a third embodiment, the rear gate actuating means 306 and the back glass actuating means 310 are electronic systems. The rear gate actuating means 306 is comprised of a rear gate switch mechanism 902A and the back glass actuating means 310 is comprised of a back glass switch mechanism 902B. The rear gate and back glass switch mechanism 902A, 902B are similar to the switch mechanism described above in relation to FIGS. 4A–4D, 5 and 6. The switch mechanisms 902A, 902B are positioned such that with full actuation of the rear gate handle 134, the back glass switch mechanism 902B is triggered prior to triggering of rear gate switch mechanism 902A.

The rear gate and back glass switch mechanisms 902A, 902B are coupled to a rear gate controller 904. The rear gate controller 904 is coupled to an electrically actuated rear gate solenoid 906 and an electrically actuated back glass solenoid 908. The rear gate solenoid 906 and the back glass solenoid 908 are coupled to the rear gate latch mechanism 202 and the back glass latch mechanism 212, respectively.

In the third embodiment, opening of both the rear gate 118 and the back glass 128 requires a single pull of the rear gate handle 134.

When the back glass switch mechanism 902B is triggered, the back glass 128 is opened via the rear gate controller 904 and the back glass solenoid 908, as described above.

When the rear gate switch mechanism 902A is triggered, the rear gate controller 904 actuates the rear gate solenoid 906. When actuated, the rear gate solenoid 904 actuates rear gate latch mechanism 202 to release the rear gate 118 from its latched position.

With reference to the above and in operation, the present invention provides a dual action rear gate door handle assembly 102. Opening of both the back glass 128 and the rear gate 118 may be accomplished in sequence using one hand through a single pull or two pulls of the rear gate handle 134.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A rear gate assembly of a motor vehicle having a rear gate opening, comprising:
    a rear gate being rotatably coupled to the rear gate opening, the rear gate having a latched and unlatched position;
    a back glass being rotatably coupled to a top edge of the rear gate opening, the back glass having a latched and unlatched position;
    a rear gate handle coupled to the outer surface of the rear gate and being actuatable from a first position to a second position, wherein the rear gate handle includes:
        a base portion;
        a handle portion rotably coupled to the base portion; and a U-shaped actuation portion extending from one end of the handle portion through an aperture in the base portion; and means for sequentially releasing the back glass and rear gate from the respective latched positions in response to actuation of the rear gate handle, wherein the rear gate handle includes a first and second position and is operable between the first and second position and the means for sequentially releasing the back glass and rear gate includes:

rear gate latch means coupled to the rear gate for controllably latching and releasing the rear gate from the latched position;

rear gate actuating means coupled to the rear gate handle and to the rear gate latch means, the rear gate actuating means being responsive to the rear gate handle being moved from the, first position to the second position and controllably actuating the rear gate latch means to release the rear gate from the latched position;

back glass latch means coupled to the back glass for controllably latching and releasing the back glass from the latched position; and, back glass actuating means coupled to the rear gate handle and to the back glass latch means, the back glass actuating means being responsive to the rear gate handle being moved from the first position to the second position and controllably actuating the back glass latch means to release the back glass from the latched position.

2. A rear gate assembly, as set forth in claim 1, wherein the rear gate actuation means includes:

first and second mounting flanges extending from the base portion;

a camming plate rotably coupled to the first and second mounting flanges;

a first lever portion extending from the camming plate and being inserted into the U-shaped actuation portion; and a spring biased between the camming plate and the base portion and adapted to bias the camming plate in a downward position relative to the base portion.

3. A rear gate assembly, as set forth in claim 2, wherein the rear gate latch means includes:

a rear gate latch mechanism coupled to the rear gate;

a second lever portion extending from the camming plate; and an acting rod coupled between the second lever portion and the rear gate latch mechanism.

4. A rear gate assembly, as set forth in claim 2, including a camming plate rotably coupled to the first and second mounting flanges, a first lever portion extending from the camming plate and being inserted into the U-shaped actuation portion, and a spring biased between the camming plate and the base portion and adapted to bias the camming plate in a downward position relative to the base portion, wherein the camming plate is rotated in response to actuation of the rear gate handle.

5. A rear gate assembly, as set forth in claim 4, wherein the back glass actuating means includes:

a switch mechanism; and a switch engaging portion extending from the camming plate.

6. A rear gate assembly, as set forth in claim 5, wherein the switch mechanism includes a switch and a contact portion, the switch having a body, a pushbutton, wherein the contact portion extends over the pushbutton, wherein the back glass actuating means is adapted to actuate the switch through contact of the switch engaging portion and the contact portion during rotation of the camming plate and wherein the switch is adapted to produce a switch actuation signal in response to actuation thereof.

7. A rear gate assembly, as set forth in claim 6, wherein the contact portion includes a linear and a nonlinear portion.

8. A rear gate assembly, as set forth in claim 7, wherein the back glass latch means includes a back glass controller and an electrically actuated solenoid, wherein the back glass controller is adapted to receive the switch actuation signal and responsively actuate the electrically actuated solenoid and wherein the electrically actuated solenoid is adapted to release the back glass from its latched position.

9. A rear gate assembly of a motor vehicle having a rear gate opening, comprising:

a rear gate being rotatable coupled to the rear gate opening, the rear gate having a latched and unlatched position;

a back glass being rotatable coupled to a top edge of the rear gate opening, the back glass having a latched and unlatched position;

a rear gate handle coupled to the outer surface of the rear gate and being actuatable from a first position to a second position;

means for sequentially releasing the back glass and rear gate from the respective latched positions in response to actuation of the rear gate handle, the means for sequentially releasing the back glass and rear gate including:

rear gate latch means coupled to the rear gate for controllably latching and releasing the rear gate from the latched position;

rear gate actuating means coupled to the rear gate handle and to the rear gate latch means, the rear gate actuating means being responsive to the rear gate handle being moved from the first position to the second position and controllably actuating the rear gate latch means to release the rear gate from the latched position;

back glass latch means coupled to the back glass for controllably latching and releasing the back glass from the latched position; and, back glass actuating means coupled to the rear gate handle and to the back glass latch means, the back glass actuating means being responsive to the rear gate handle being moved from the first position to the second position and controllably actuating the back glass latch means to release the back glass from the latched position; and, wherein rear gate actuating means and the back glass actuating means includes:

a switch mechanism coupled to the rear gate handle and adapted to produce a switch actuation signal in response to actuation of the rear gate handle, and a rear gate controller coupled to the switch mechanism;

an electrically actuated rear gate solenoid coupled to the rear gate controller and the rear gate; and, an electrically actuated back glass solenoid coupled to the rear gate controller and the back glass, wherein the rear gate controller is adapted to actuate the electrically actuated back glass solenoid and release the back glass from its latched position in response to receiving a first switch actuation signal and to actuate the electrically actuated rear gate solenoid and release the rear gate from its latched position in response to receiving a second switch actuation signal with in a predetermined time period of receiving the first switch actuation signal.

10. A rear gate assembly of a motor vehicle having a rear gate opening, comprising:

a rear gate being rotatably coupled to the rear gate opening, the rear gate having a latched and unlatched position;

a back glass being rotatably coupled to a top edge of the rear gate opening, the back glass having a latched and unlatched position;

a rear gate handle coupled to the outer surface of the rear gate and being actuatable from a first position to a second position; and means for sequentially releasing the back glass and rear gate from the respective latched positions in response to actuation of the rear gate handle, wherein the means for sequentially releasing the back glass and rear gate includes:

rear gate latch means coupled to the rear gate for controllably latching and releasing the rear gate from the latched position;

rear gate actuating means coupled to the rear gate handle and to the rear gate latch means, the rear gate actuating means being responsive to the rear gate handle being moved from the first position to the second position and controllably actuating the rear gate latch means to release the rear gate from the latched position;

back glass latch means coupled to the back glass for controllably latching and releasing the back glass from the latched position; and, back glass actuating means coupled to the rear gate handle and to the back glass latch means, the back glass actuating means being responsive to the rear gate handle being moved from the first position to the second position and controllably actuating the back glass latch means to release the back glass from the latched position; and wherein rear gate actuating means and the back glass actuating means includes:

a first switch mechanism coupled to the rear gate handle and adapted to produce a first switch actuation signal in response to actuation of the rear gate handle;

a second switch mechanism coupled to the rear gate handle and adapted to produce a second switch actuation signal in response to further actuation of the rear gate handle;

a rear gate controller coupled to the first and second switch mechanisms;

an electrically actuated rear gate solenoid coupled to the rear gate controller and the rear gate; and, an electrically actuated back glass solenoid coupled to the rear gate controller and the back glass, wherein the rear gate controller is adapted to actuate the electrically actuated back glass solenoid and release the back glass from its latched position in response to receiving the first switch actuation signal and to actuate the electrically actuated rear gate solenoid and release the rear gate from its latched position in response to receiving the second switch actuation signal.

* * * * *